J. B. ANDERSON.
ROPE FASTENER.
APPLICATION FILED MAY 7, 1908.

904,747.

Patented Nov. 24, 1908.

WITNESSES:

INVENTOR
James B. Anderson
BY Edward A. Lawrence
HIS ATTORNEY

UNITED STATES PATENT OFFICE.

JAMES B. ANDERSON, OF SHALER TOWNSHIP, ALLEGHENY COUNTY, PENNSYLVANIA, ASSIGNOR OF ONE-HALF TO LOUIS H. STEITZ, OF PITTSBURG, PENNSYLVANIA.

ROPE-FASTENER.

No. 904,747.

Specification of Letters Patent.

Patented Nov. 24, 1908.

Application filed May 7, 1908. Serial No. 431,330.

*To all whom it may concern:*

Be it known that I, JAMES B. ANDERSON, a citizen of the United States, and residing in the township of Shaler, in the county of Allegheny and State of Pennsylvania, have invented or discovered new and useful Improvements in Rope-Fasteners, of which the following is a specification.

My invention consists of certain new and useful improvements in devices for fastening the loose ends of ropes and cords. It is useful for many purposes where a rope is to be securely fastened, as for instance a clothes line, hammock rope, halter rope, ropes used in connection with hoisting and other tackle, ropes used to secure loads on vehicles and for many other purposes.

Figure 1:
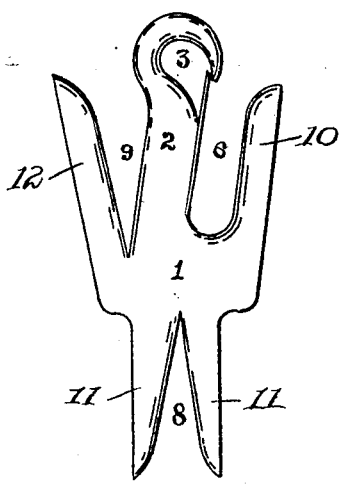
Figure 2:
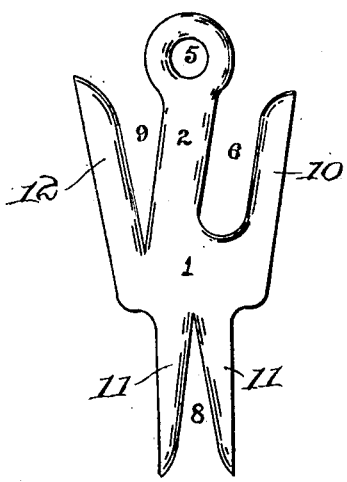
Figure 3:
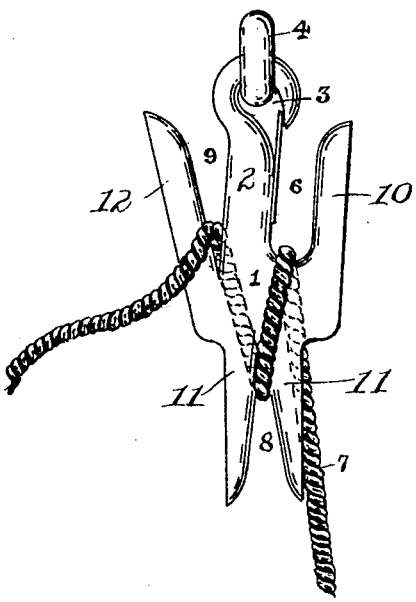

In the drawings which illustrate my invention, Figure 1 is a plan view of the fastener provided with a spring snap for attaching the same to a fixed ring, Fig. 2 is a similar view showing the fastener provided with an eye for engagement with a fixed hook and Fig. 3 is a view similar to Fig. 1 showing the spring snap engaging the ring and the rope secured to the fastener.

The following is a description of the drawings—

1 is the body-region of the fastener, which is preferably cast stamped or otherwise formed of metal. 2 is the shank by means of which the fastener is mounted in place. In Figs. 1 and 3 I have shown the shank which is inclined relative to the body-region 1 and provided with an integral spring snap 3 which in Fig. 3 is shown engaging a ring 4. In Fig. 2 I have shown the shank 2 provided with an eye 5 which may be slipped over a fixed hook, not shown. Extending upward from the top of said body-region 1, and disposed to one side of and parallel with said shank 2, is an arm 10, forming a tension-slot or recess 6, having a rounded bottom, against which the rope may be tightened without danger of fraying or cutting the same. Extending downward from the bottom of said body-region 1, and forming a V-shaped clamping-slot or recess 8 therebetween, is a pair of oppositely-inclined legs 11, 11. Into this recess 8 the rope is led from the recess 6, being clamped between the walls of said recess 8. Extending upward from the top of said body-region 1, and disposed on the other side of the shank 2 from the arm 10, and inclined from said shank, is another arm 12, forming a V-shaped clamping-slot or recess 9. The rope is led from the recess 8 into the recess 9, wherein it is clamped. The recess 6 is deep enough to prevent the rope 7 from slipping out of said recess when swung from side to side, as in the case of a hammock-rope.

The operation of my invention is as follows. The fastener is mounted in place by means of its spring snap or eye, and the rope 7 is led over the rounded bottom of recess 6 and tightened to the desired degree by pulling on the loose end of the rope. The rope is then led through recess 8 in which it clamps itself in response to a pull on the loose end. The loose end is then drawn through recess 9 in which it also clamps itself in response to a pull on the loose end thereof. Many other methods of attachment to the fastener may be used but the above is the preferable.

The advantage of the two opposed clamping recesses is that where but one clamping recess is provided, unless the loose rope end be secured, by wrapping it around the fastener, it may loosen itself and allow the rope to be disengaged. Where two clamping recesses are provided the end of the rope need not be otherwise secured for the recess 9 by holding the rope end prevents the same from becoming loosened from the recess 8. By placing the recess 8 in an opposed direction to recess 6 the rope may be clamped in said recess 8 without loosening the tension on the rope by the clamping operation.

The greater the load or pull on the rope 7, the more securely is it clamped in the fastener, but at the same time it may be disengaged therefrom readily and easily without slackening the rope or removing the load or pull therefrom.

The depth of the recess 6 prevents the rope slipping out of the same from lateral motion or other causes and the incline of said recess toward the axis of the fastener renders the pull or tension of the rope, notwithstanding lateral motion, always substantially in line with the longitudinal axis of the fastener.

What I desire to claim is:—

A rope-fastener, comprising the following integral parts: a central body-region, a shank extending upward from the top of said body-region and inclined relative thereto; an arm also extending upward from the top of said body-region, and disposed to one side of and parallel with said shank, forming a tension-slot; an arm disposed on the other side of said shank and inclined therefrom, forming a V-shaped clamping-slot, said arm also extending upward from the top of said body-region; a pair of oppositely-inclined legs extending downward from the bottom of said body-region and forming a V-shaped clamping-slot therebetween; said lower clamping-slot being so disposed relative to the two upper slots that a vertical line bisecting said lower slot will pass between said upper slots.

Signed at Pittsburg, Pa., this 4th day of May, 1908.

JAMES B. ANDERSON.

Witnesses:
EDWARD A. LAWRENCE,
J. H. HARRISON.